US006687138B1

(12) United States Patent
Poindexter

(10) Patent No.: US 6,687,138 B1
(45) Date of Patent: Feb. 3, 2004

(54) CIRCUIT SYNCHRONIZATION APPARATUS AND METHOD

(75) Inventor: Brian N. Poindexter, Gardner, KS (US)

(73) Assignee: Garmin Ltd. (KY)

( * ) Notice: Subject to any disclaimer, the term of this patent is extended or adjusted under 35 U.S.C. 154(b) by 60 days.

(21) Appl. No.: 10/086,930

(22) Filed: Feb. 28, 2002

(51) Int. Cl.[7] .......... H02M 3/335
(52) U.S. Cl. .......... 363/21.18; 363/21.12
(58) Field of Search .......... 363/16–20, 21.12, 363/21.18, 21.17, 70, 97, 127; 315/291, 209 R, 224

(56) References Cited

U.S. PATENT DOCUMENTS

| | | | | |
|---|---|---|---|---|
| 4,525,674 A | | 6/1985 | Kammiller | 328/63 |
| 5,422,589 A | | 6/1995 | Shyi-Hon | 327/530 |
| 6,563,725 B2 | * | 5/2003 | Carsten | 363/127 |
| 6,583,994 B2 | * | 6/2003 | Clayton et al. | 363/21.18 |

OTHER PUBLICATIONS

"High Power CCFL Controller for Wide Dimming Range and Maximum Lamp Lifetime", *Linear Technology Corporation, California*, pp. 1–20, (2000).

"UC3842/3/4/5 Provides Low–Cost Current–Mode Control", *Unitrode Application Note*, pp. 3–53–3–66, (1999).

Philpott, R., "High Power Desktop LCD Backlight Controller Supports Wide Dimming Ratios While Maximizing Lamp Lifetime —Design Note 264", *Linear Technology Design Notes*, Linear Technology Corporation, California, 2 pgs., (2001).

* cited by examiner

*Primary Examiner*—Wilson Lee
(74) *Attorney, Agent, or Firm*—Devon A. Rolf

(57) ABSTRACT

Several synchronization circuits, a computer, a method of adjusting the operation of an oscillator, and method of operating a power converter are disclosed. The circuits and computer include a switch coupled to a current path. The switch receives a synchronizing signal, and is turned on by an active state of the synchronizing signal, and turned off by an inactive state of the synchronizing signal. The current path is configured to pass a current when the switch is off, and the switch is configured to pass the current when turned on. This abstract is provided to comply with the rules requiring an abstract that allow any reader to quickly ascertain the subject matter of the technical disclosure. It is submitted with the understanding that it will not be used to interpret or limit the scope or meaning of the claims.

6 Claims, 9 Drawing Sheets

CIRCUIT SYNCHRONIZATION APPARATUS AND METHOD

FIELD OF THE INVENTION

The present invention is generally related to apparatus and methods used to adjust the operational frequency of selected circuitry. More particularly, the invention is related to apparatus and methods used to synchronize the operation of a circuit to a selected frequency, as may be useful for power supplies, converters, and other electronic apparatus.

BACKGROUND OF THE INVENTION

Cold cathode fluorescent lighting is widely used for solid-state computer display backlighting. High voltage power supplies designed to drive modem cold cathode fluorescent lamps (CCFLs) typically employ application-specific integrated circuits (ICs) to control the CCFL brightness. This is usually accomplished by controlling the current in the primary winding circuit of a Royer-class converter using a first level of high-frequency pulse width modulation (PWM) (e.g., at a frequency of approximately 350 kHz), and a second, additional level of low-frequency (e.g., 200 Hz) on-off modulation of the PWM current control signal. An example of an IC commonly used in this application is the Linear Technology LT1768, a high-power CCFL controller. Details of the LT1768 circuitry can be obtained by referring to publicly-available documentation, such as the data sheet information published at http://www.linear-tech.com/go/dnLT1768, as well as the article "High Power Desktop LCD Backlight Controller Supports Wide Dimming Ratios While Maximizing Lamp Lifetime" by Richard Philpott of Linear Technology, Design Note 264, August 2001, published at http://www.linear-tech.com/pub/ document.html ? pub_ type=desn & document=292, both references being incorporated herein by reference in their entirety.

FIG. 1 is a representative schematic diagram of a prior art power supply which makes use of an LT1768 to operate one or more CCFLs. In this case, the circuitry includes a dual-grounded lamp backlight inverter that operates from an input voltage $V_{IN}$ of about 9–24 VDC. The Royer converter 100 delivers current ranging from about 0–9 mA to each CCFL 102. Using the circuit values shown, the LT1768 IC 104 operates as a 350 kHz fixed frequency, current mode, pulse width modulator to control the Royer converter 100. As is typical of controller ICs of this type, the second level of low-frequency PWM on-off modulation frequency is usually set by selecting the value of an external timing capacitor, $C_T$, for example, connected to a specific pin (e.g., the PWM modulation on-off frequency timing input 108) on the controller IC 104. Considering the circuit values shown in FIG. 1, the low-frequency oscillation frequency occurs at about 220 Hz.

A representation of the low-frequency oscillation voltage present at the timing input 108 of the prior art LT1768 IC 104 of FIG. 1 can be seen in FIG. 2. During operation of the PWM controller IC, an internal current source is first applied to the timing input at time $t=t_0$ so as to produce a positive-going voltage ramp 216 at the timing input, due to the charging action of the capacitor $C_T$. When the voltage at the $C_T$ pin 108 reaches a first specified value (e.g., an upper threshold voltage 218), the internal current source is removed from the timing input, and an internal current sink (usually sinking a larger current value than the internal current source supplies) is applied. The result is a rapidly falling voltage ramp 220 (relative to the slope of the current-source, positive-going ramp 216) due to the discharging action of the capacitor $C_T$ at the timing input. When the voltage at the $C_T$ pin reaches a second specified value (e.g., a lower threshold voltage 222 which is less than the upper threshold voltage 218), the internal current sink is removed from the timing input. The internal current source is then re-applied to the timing input, initiating another charge/discharge cycle of the capacitor $C_T$. This occurs at $t=t_P$, which is the natural period of the PWM low-frequency modulation for the IC (e.g., about 5 milliseconds at 220 Hz).

Some controller ICs use resistive networks instead of current sources/sinks to charge/discharge the capacitor $C_T$. In this case, the low-frequency modulation voltage waveform at the timing input will possess a ramp with an exponential slope, rather than a linear slope. Otherwise, the operation is essentially the same as described previously.

In the case of low-frequency, on-off duty cycle modulation of the PWM waveform in CCFL converters, it is usually desirable to be able to lock the modulation frequency to some multiple of the display refresh rate (or some other critical parameter) to avoid visual interference effects on the display. In other types of switching power supplies it is also be desirable to lock the PWM oscillation frequency to a known time base in order to avoid radio interference and other undesirable effects.

A typical method of synchronizing the low-frequency operation of controllers for CCFL inverters and other PWM power supply circuits involves injection-locking the PWM timing oscillator to a desired frequency. For example, short duration pulses 224 can be injected into a junction formed between the low side of the capacitor $C_T$ and a resistor (e.g., resistor 109 in FIG. 1) connected to ground. This causes the upper threshold voltage of the ramped modulation waveform to be reached at a point in time $t=t_s$ just after the injection takes place, and the discharge portion of the oscillator cycle begins immediately after the pulse is removed. While this has the effect of ending the charging portion of the cycle sooner than would otherwise occur (e.g., at $t=t_E$), the pulse width $t_w$ of the injection signal must be kept very short or else the discharge portion of the modulation oscillator cycle will be delayed and "held high" by the synchronization pulse 224.

To complicate matters, some controllers cannot tolerate voltages at the timing input which exceed the upper threshold voltage 218 value by more than a nominal amount. This means that the injection pulse amplitude $V_P$ must also be carefully controlled to avoid exceeding the specified value required by the controller IC, since it adds to the upper threshold voltage 218 to form a maximum $C_T$ voltage 225 prior to discharge, at least to some degree. For example, in the case of the LT1768, the upper threshold voltage value should be limited to the same voltage that is applied to a programming pin (i.e., the "PWM" pin in FIG. 1).

To deal with these concerns, the manufacturer suggests taking the approach shown in FIG. 3, which is a representative schematic diagram of a prior art synchronization circuit having a controlled injection pulse. This circuit 326 can be used as a synchronizing mechanism for the prior art power supply of FIG. 1. The common trait shared by standard injection locking techniques, previously described, as well as the more complex example shown in FIG. 3, is that several parts must be used, which increases overall circuit cost. Standard synchronizing techniques also waste power because they inject a current pulse directly into the timing circuitry, including $C_T$ and/or other elements connected to it, such as a resistor (e.g., resistor 109 in FIG. 1).

The injection point is also typically a low impedance point, resulting in pulse currents of an amplitude sufficient to produce conducted and/or radiated electromagnetic interference. Finally, standard injection locking techniques tend to halt or "freeze" the operation of internal PWM oscillator circuitry 328 until the synchronizing pulse is removed when approaches less sophisticated than that shown in FIG. 3 are used.

Thus, there is a need in the art to provide an improved mechanism for synchronizing circuitry, such as PWM controller circuitry, to a selected frequency. Such an approach should use a minimal number of external parts. An apparatus and method should therefore be developed which act to synchronize the operation of selected circuitry, in conjunction with internal current sources/sinks, so that the affect on the oscillation waveform, other than regulating its period, is minimal. Such an apparatus and method should act to safely control the amplitude of the timing voltage waveform, such that maximum values are not exceeded, while not unduly restricting the length of the synchronizing pulse.

SUMMARY OF THE INVENTION

The above mentioned problems with the length, magnitude, and effects of synchronization pulse injection as used in synchronization applications are addressed by the present invention and will be understood by reading and studying the following disclosure. Specifically, the present invention provides methods and apparatus for synchronizing an oscillator which has an internal (or external) current source-sink, along with an internal or external capacitor, connected to a timing input terminal. The source-sink operates to charge-discharge, respectively, the capacitor at some oscillation frequency determined in part by the value of the capacitor.

In one embodiment of the present invention, a circuit useful for synchronizing an oscillator, or other circuitry, includes a switch configured to receive a synchronizing signal having an active state and an inactive state. The switch has an ON state (substantially conducting) activated by the active state of the synchronizing signal, and deactivated (substantially non-conducting or turned OFF) by the inactive state of the synchronizing signal.

The circuit also includes a current path coupled to the switch. The current path is configured to pass a current when the ON state is deactivated. The switch is configured to pass the current when the ON state is activated (i.e., the OFF state is deactivated). The switch can include a transistor, and the current path can include one or more diodes.

In another embodiment of the present invention, a circuit is provided which includes an oscillator having a current source-sink connection; a switch coupled to the current source-sink connection, and a current path coupled to the switch. Again, the switch has an ON state activated by the active state of the synchronizing signal, and deactivated by the inactive state of the synchronizing signal. The current path is configured to pass a current when the ON state is deactivated, and the switch is configured to pass the current when the ON state is activated. The circuit can include a self-oscillating, push-pull switching circuit coupled to the oscillator, such as a Royer-class converter, as well as a CCFL coupled to the switching circuit.

In yet other embodiments of the invention, a computer, possibly including a global positioning system (GPS) receiver and a display, is provided. The computer includes a processor, at least one CCFL capable of being communicatively coupled to the processor, an oscillator having a current source-sink connection, a switch coupled to the current source-sink connection, a current path coupled to the switch, and a self-oscillating, push-pull switching circuit coupled to the oscillator and to the CCFL.

In another embodiment of the invention, a method of adjusting the operation of an oscillator is provided. The method includes connecting a first capacitor to the timing input of the oscillator and a switch, and activating the switch (i.e., turning the switch ON) using a synchronizing signal in a first state to pass a current from the timing input through the switch to charge the first capacitor. The method also includes deactivating the switch (i.e., turning the switch OFF) using the synchronizing signal in a second state to pass the current through a second capacitor.

Alternatively, in yet another embodiment of the invention, a method of operating a power converter is provided. The method includes coupling an oscillator or modulator to a power converter, coupling a first capacitor to the timing input of the oscillator, and charging the first capacitor using a current which flows out of the timing input. The method also includes adding a second capacitor in series with the first capacitor to change the charging time of a series combination of the first and second capacitors to be shorter than a charging time of the first capacitor, and discharging both capacitors using a current which flows into the timing input.

These and other embodiments, aspects, advantages, and features of the present invention will be set forth in part in the description which follows, and will become apparent to those skilled in the art by reference to the description, along with the referenced drawings, and/or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the preferred embodiments, reference is made to the accompanying drawings which form a part hereof, and which show, by way of illustration, specific embodiments in which the invention can be practiced. These embodiments are intended to describe aspects of the invention in sufficient detail to enable those skilled in the art to practice the invention. Other embodiments than those described herein can be utilized, and changes can be made to the illustrated embodiments, without departing from the scope of the present invention. The following detailed description is, therefore, not to be taken in a limiting sense, and the scope of the present invention is defined only by the appended claims, along with the full scope of equivalents to which such claims are entitled.

The invention operates so as to avoid several problems encountered using prior art synchronization techniques, particularly injection locking, noted above. For example, the invention permits using a minimal number of parts to lock the low-frequency modulation frequency of a PWM oscillator to an external time base while refraining from exceeding the upper threshold voltage of a controller IC. Of course, it should be noted that the preferred embodiments described herein do not limit the application of the invention to CCFL converter circuits; the invention can be applied in general to many classes of converter circuits where synchronization to an external time base is desired.

Figure 4:
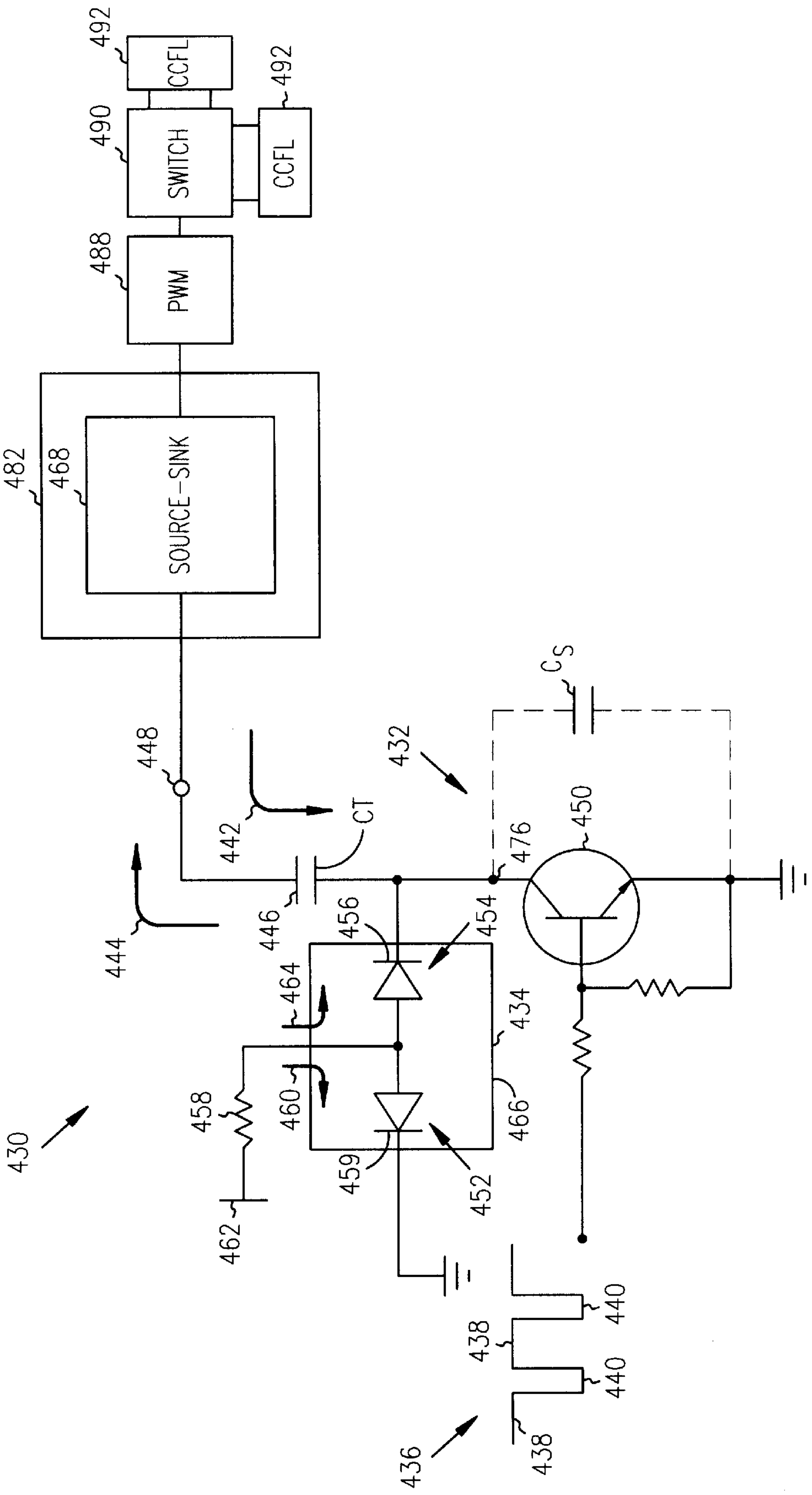
FIG. 4 is a representative schematic diagram of a synchronization circuit according to an embodiment of the present invention.

The structure of one embodiment of the invention can be seen in FIG. 4, which is a representative schematic diagram of a synchronization circuit. The circuit 430 includes a switch 432 coupled to a current path 434. In general a pulse train having a cycle period which corresponds to the desired oscillation locking frequency, such as the modulation frequency of a PWM controller, is used for a synchronizing signal. The ultimate source for the synchronizing signal can be inverted, relative to what is shown in the figures, with appropriate inverting logic applied elsewhere to achieve the ultimate desired function of the invention.

The switch 432 is configured to receive a synchronizing signal (hereinafter the SYNC signal) 436 having an active state 438 and an inactive state 440. The switch 432 has an OFF state, wherein the switch 432 operates so as to be substantially non-conducting, and an ON state, wherein the switch 432 operates so as to be substantially conducting. The ON state is activated (i.e., the switch is turned on) by the active state 438 of the SYNC signal 436, and the ON state is deactivated (i.e., the OFF state is activated, or the switch is turned off) by the inactive state 440 of the SYNC signal 436. The switch is configured to pass the charging current 442 when the ON state is activated (i.e., the OFF state is deactivated), and the current path 434, which is coupled to the switch 432, is configured to pass the current 444 when the ON state is deactivated. The circuit 430 can also include a capacitor 446 (e.g., $C_T$) coupled to the switch 432 and the current path 434, perhaps using an integrated circuit pin at the timing input 448 configured to source and sink the currents 442, 444.

Thus, the switch 432 is configured to pass the source current 442 when the ON state is activated and the current 442 flows in the intended direction for the switch 442. The current path 434 is configured to pass the sink current 444 when the OFF state of the switch 432 is activated, or when the current flows in a direction opposite to an intended current flow direction (i.e., the direction of current 442 for the NPN bipolar junction transistor 450) in the switch 432.

As shown in FIG. 4, the switch 432 includes the transistor 450 and the current path 434 includes a pair of diodes 452, 454. The cathode 456 of one of the pair of diodes 454 is coupled to the switch 432, and a resistor 458 is coupled between a voltage supply 460 and the anodes of the pair of diodes 452, 454. The cathode 459 of the other one of the pair of diodes 452 is coupled to a reference voltage source, such as ground. The value of the resistor 458 is typically selected so that the diode 452 continues to conduct current 460 originating from the supply 462, even when the sink current 444 is coupled to the switch 432 and the diode 454. In other words, the value of the resistor 458 is typically selected so that the magnitude of the current flowing from the voltage supply 462 through the resistor 458 is always greater than the magnitude of the sink current 444 coupled to the switch 432. As will be discussed below, the current path 434 can include a voltage clamping circuit 466, shown in exemplary form in FIG. 4, and taking the form of the diode pair 452, 454 having their anodes connected together. The pair of diodes 452, 454 can be packaged individually, or as part of a single packaged circuit or device, possibly having an external pin connected to the junction of the anodes of the diodes 452, 454.

Building on the illustrated embodiment, and noting that the switch 432 is coupled to the current source-sink timing input connection 448 using a capacitor $C_T$, the current source-sink 468 can be included in an oscillator 482 and coupled to a pulse width modulator 488, comprising, in turn, a portion of a power-supply controlling integrated circuit, such as the LT1768. Various embodiments of the invention can also include a self-oscillating, push-pull switching circuit 490 coupled to the oscillator 482, such as a current-driven Royer-class converter whose output current level is controlled by the pulse width modulator 488. Further, some embodiments of the invention can include one or more CCFLs 492 coupled to the self-oscillating, push-pull switching circuit 490. When this type of circuit is realized, improved operation of the CCFLs 492 can often be obtained by using a two-level pulse width modulation scheme. The first level of pulse width modulation controls the current to the Royer-class converter, and the second level of pulse width modulation causes the Royer-class converter to alternately switch between an on state and an off state, at a lower frequency, sometimes synchronized with the first level of pulse width modulation. The second level of pulse width modulation can also be used to cause the Royer-class converter to alternately switch between an on state and a reduced current state relative to the on state, again at a lower frequency, and sometimes synchronized with the first level of pulse width modulation.

Figure 5:
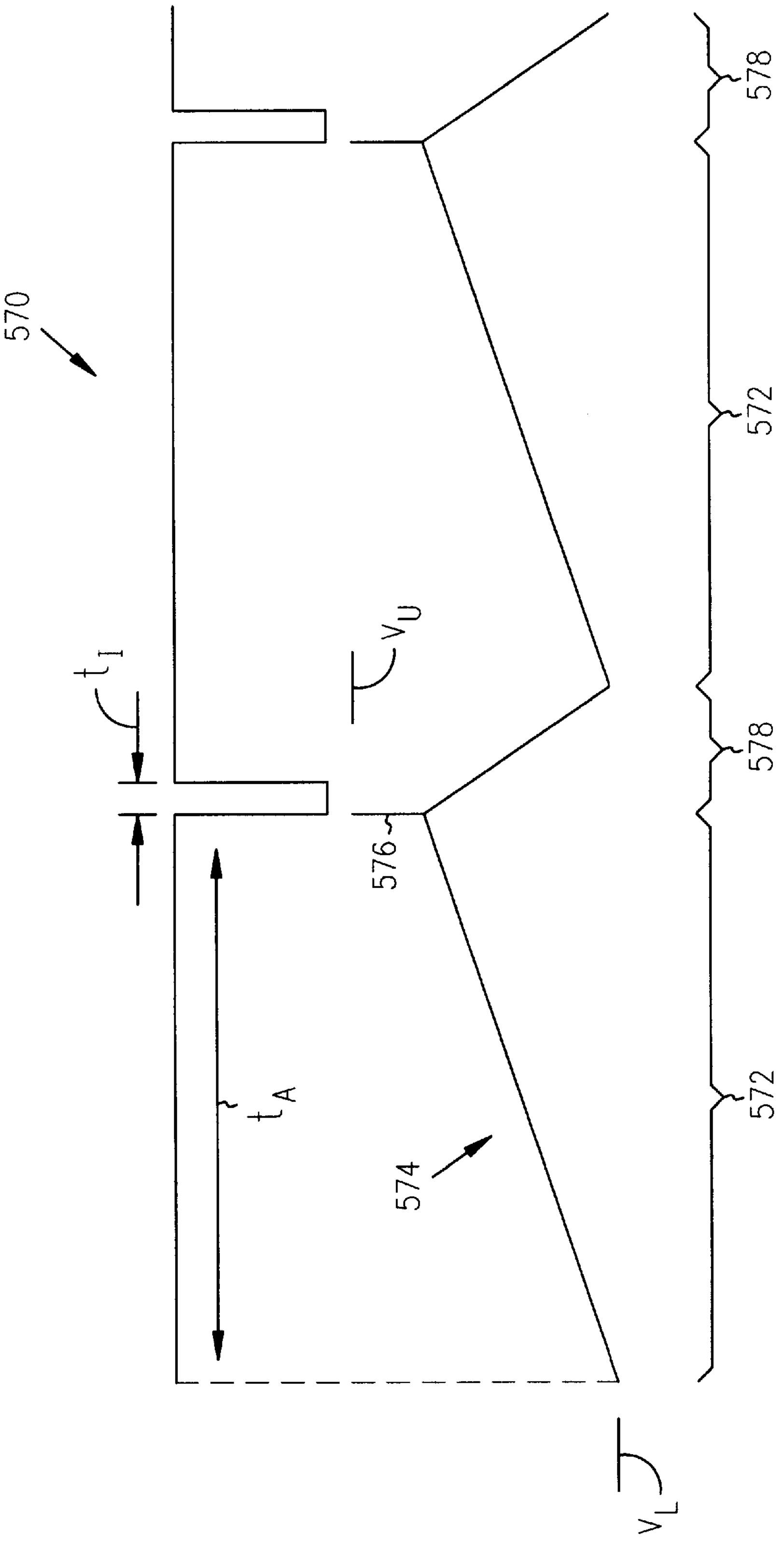
FIG. 5 is a representation of the synchronization signal input and voltage waveform output for the exemplary synchronization signal circuit of FIG. 4.

FIG. 5 is a representation of the synchronization signal input and resulting composite voltage which appears at the timing input for the exemplary synchronization signal circuit of FIG. 4. Referring now to FIGS. 4 and 5, it can be seen that during the period of time $t_A$ that the SYNC signal 570 is high (active), the low side of the capacitor $C_T$ is connected to ground through a low impedance presented by the switch 432, which has the ON state activated (i.e. the OFF state is deactivated). The current source-sink 468 (typically internal to a controller IC, and comprising a current source, a current sink, and a switch capable of selectively coupling the current source or the current sink to the timing input 448) supplies current 442 to charge the capacitor $C_T$ during the time $t_A$ and a linear, positive ramp voltage 572 can be observed as part of the composite voltage waveform 574 at the timing input 448.

When the SYNC signal 570 goes low (during the period of time $t_I$), the switch 432 abruptly turns off (i.e., the ON state is deactivated, and the OFF state is activated). Since the source current 442 remains unchanged, the voltage 576 at the timing input 448 abruptly moves higher because the capacitance being driven (essentially the series combination of the stray capacitance $C_S$ now coupled between the capacitor $C_T$ and ground, and $C_T$), is very small compared to $C_T$. Due to this relationship between the capacitors $C_T$ and $C_S$, the voltage directly across $C_T$ remains almost constant during the time interval $t_I$, and the voltage at the low side of $C_T$ (at junction 476) tracks the voltage at the timing input 448, offset by a substantially fixed amount, nearly equal to the voltage across $C_T$ just before the switch 432 turned off.

When the voltage at the timing input 448 moves abruptly upward, the upper threshold voltage $V_U$ is reached very quickly. When the threshold is reached, the discharge cycle 578 starts immediately. The sink current 444 flows into the timing input 448, and the voltage at the timing input drops very quickly until the non-grounded cathode 456 of diode pair 434 conducts, supplying current 464 through the capacitor $C_T$ and into the timing input 448. The voltage at the junction 476 (on the low side of the capacitor $C_T$) is clamped at a level very close to ground. Thus, the diode 454 can be said to simulate the ground reference voltage during the time the capacitor $C_T$ is discharged into the timing input 448. The low or inactive state pulse width $t_I$ of the SYNC signal 570 should be short enough so that the SYNC signal 570 returns to a high, or active state before the discharge cycle 578 is complete.

Figure 6:
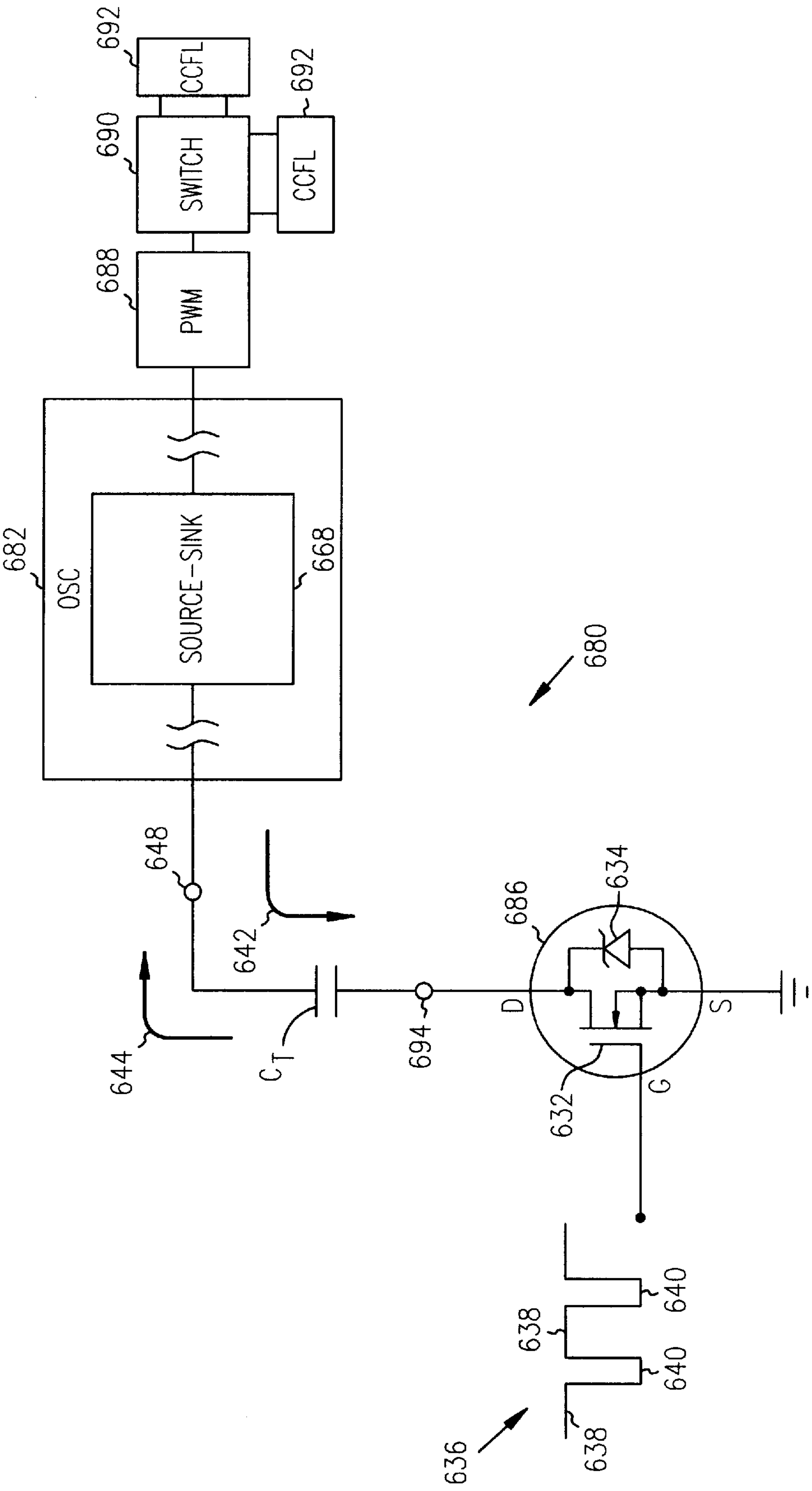
FIG. 6 is a representative schematic diagram of a synchronization circuit according to an alternative embodiment of the present invention.

FIG. 6 is a representative schematic diagram of a synchronization circuit according to an alternative embodiment of the present invention. The circuit 680 includes an oscillator 682 having a current source-sink connection 684, a switch 632 coupled to the current source-sink connection 648, and a current path 634 coupled to the switch 632. As described previously, the switch 632 is configured to receive a synchronizing signal 636 having an active state 638 and an inactive state 640. The switch 632 has an ON state activated by the active state 638 of the synchronization signal 636, and deactivated by the inactive state 640 of the synchronization signal 636. The current path 634 is configured to pass a current 644 when the ON state is deactivated, and the switch 632 is configured to pass the current 642 when the ON state is activated. In the embodiment illustrated, the switch 632 and the current path 634 are included in a metal oxide semiconductor field effect transistor (MOSFET) 686 having an integral, or intrinsic reverse diode 634. As described previously, with respect to the embodiment of FIG. 4, the switch 632 is typically coupled to the current source-sink connection 648 using a capacitor $C_T$, and the oscillator 682 can be coupled to a pulse width modulator 688, comprising a portion of a power-supply controlling integrated circuit, such as the LT1768.

Thus, various embodiments of the invention can also include a self-oscillating, push-pull switching circuit 690 coupled to the oscillator 682, such as a current-driven Royer-class converter whose output current level is controlled by the pulse width modulator 688. Further, some embodiments of the invention can include one or more CCFLs 692 coupled to the self-oscillating, push-pull switching circuit 690. A two-level pulse width modulation scheme can also be used, such that the first level of pulse width modulation controls the current to the Royer-class converter, and the second level of pulse width modulation causes the Royer-class converter to alternately switch between an on state and an off state, at a lower frequency, sometimes synchronized with the first level of pulse width modulation. As described previously, the second level of pulse width modulation can also be used to cause the Royer-class converter to alternately switch between an on state and a reduced current state relative to the on state, again at a lower frequency, and sometimes synchronized with the first level of pulse width modulation.

Figure 7:
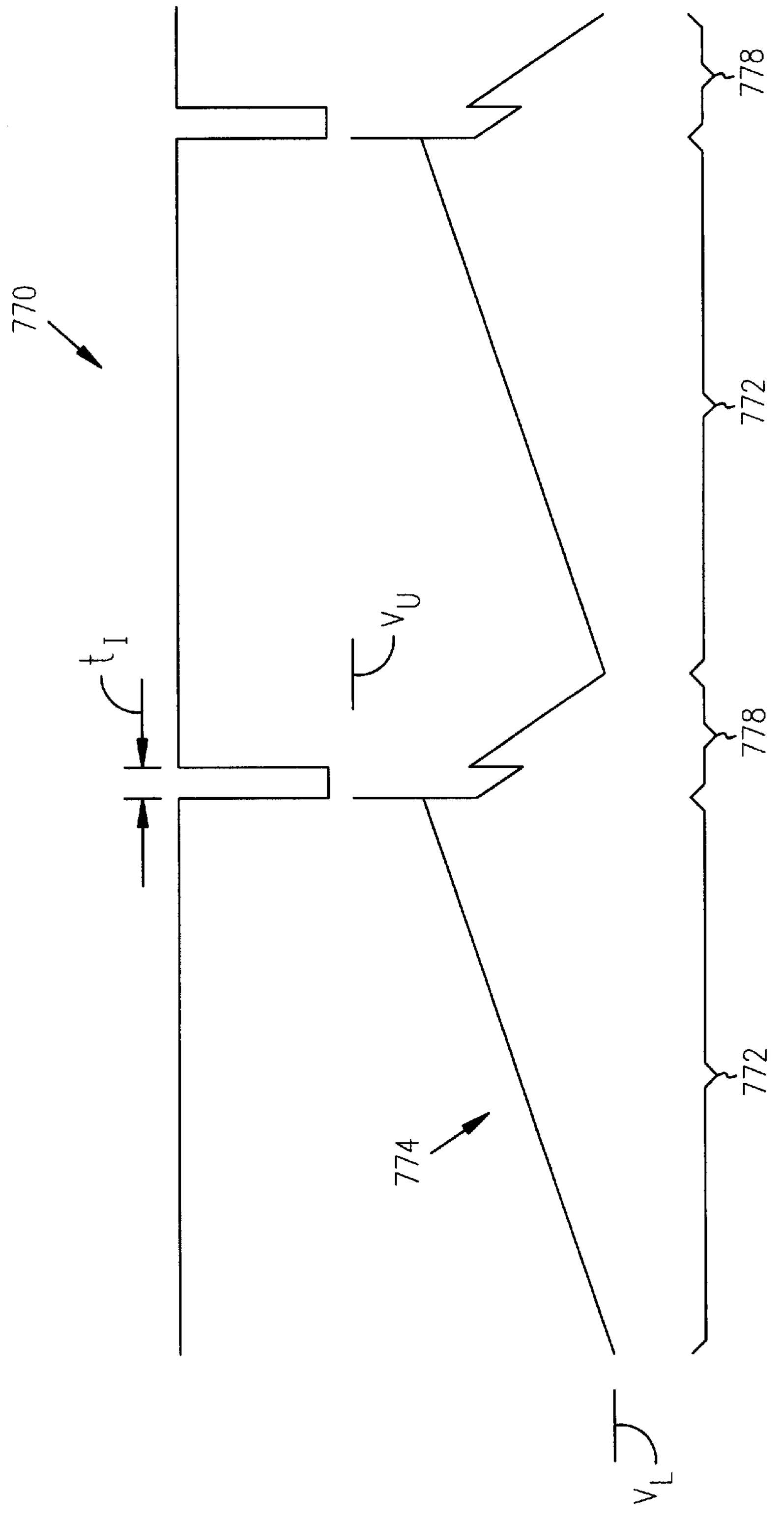
FIG. 7 is a representation of the synchronization signal input and voltage waveform output for the exemplary synchronization signal circuit of FIG. 6.

FIG. 7 is a representation of the synchronization signal input and resulting composite voltage which appears at the timing input for the exemplary synchronization signal circuit of FIG. 6. As mentioned above, the switch and current path in this case are included in a single MOSFET. However, the operation of the circuit is quite similar to that of the circuit illustrated in FIG. 4. One difference is that the low state pulse width (inactive state) $t_I$ of the SYNC signal must generally be kept as short as possible. The reason for this restriction will become apparent after referring to the following description of FIGS. 6 and 7.

Assuming that the active and inactive states of the SYNC signal 770 exist as described above, it should be noted that when the upper threshold voltage $V_U$ is reached by the composite voltage waveform 774, just after the switch 632 has been turned off, the current sink is switched on. However in this case there is no voltage clamping circuit coupled to the capacitor $C_T$ until the low side of $C_T$ (junction 694) has reached about one diode drop (e.g., about 0.7 volts) below ground. At this time, the current path 634, which includes the integral reverse diode in the MOSFET 686, clamps the junction 694 at one diode drop below ground and the source-sink 668 sinks current 644 from ground through $C_T$. When the SYNC signal 770 goes high (active) again, the switch 632 turns on (i.e., the ON state is activated) and the clamping voltage at the junction 694 abruptly changes from one diode drop below ground to substantially equal to ground. The waveform 774 at the current source-sink connection 684 reflects the offset step voltage change corresponding to the abrupt change in clamping voltage. Due to the negative-going offset inserted by the negative clamping voltage of the current path 634, in the form of an internal diode, it is sometimes possible for the lower threshold voltage $V_L$ to be reached at the current source-sink connection 684 while the SYNC signal is still low (inactive), which would result in the premature initiation of a new charging cycle 772. Thus, care must be taken so that the SYNC signal 770 low state pulse width $t_I$ is long enough to allow the upper voltage threshold $V_U$ to be reached at the end of the charging cycle 772, and short enough that the lower threshold $V_L$ is not reached prematurely during the discharge cycle 778 (due to the negative shift in the waveform 774 at this time).

When the embodiments illustrated in FIGS. 4 and 6 are used, it should be noted that the unsynchronized, or free-running, cycle period of the oscillator should be longer than the synchronization cycle period (i.e., $t_A+t_I$). As will be realized by those skilled in the art, this is accomplished by using a larger value for $C_T$ than would be otherwise selected if the synchronized oscillation time period were chosen as the natural oscillation cycle time period initially achieved. Those skilled in the art will also realize that either embodiment can be driven using a SYNC signal having standard logic-levels if appropriate component choices are made.

It should also be noted that the switch in the preferred embodiments can function as a voltage controlled switch, a current controlled switch, or some combination of these, driven by an external time base (i.e., the SYNC signal). Thus, other embodiments can be conceived that use other combinations of components to achieve the same end function of a switch coupled to a current path and controlled by an external time base while still being considered as coming within the scope of the invention.

Similarly, the function of the current path in the preferred embodiments is to provide a path for current to flow into the source-sink connection when the switch is turned off (i.e., the ON state is deactivated, such that the switch is substantially non-conducting). Thus, other embodiments can be conceived that use other combinations of components to achieve the same end function of providing a path for sink current to flow while the switch is turned off, while still being considered as falling within the scope of the invention. Finally, the preferred embodiments described do not limit the application of the invention to CCFL converter circuits; the invention can be applied in a general fashion to many classes of converter circuits where synchronization to an external time base is desired.

Therefore, one of ordinary skill in the art will understand that the apparatus of the present invention can be used in applications other than for circuitry such as PWM and CCFL drive circuitry, and thus, the invention is not to be so limited. The illustration of apparatus circuitry 430 and 680 in FIGS. 4 and 6, respectively, are intended to provide a general understanding of the structure of the present invention, and are not intended to serve as a complete description of all the elements and features of signal synchronization apparatus contemplated within the scope of the present invention.

Applications which can include the novel signal synchronization apparatus of the present invention include electronic circuitry used in high-speed computers, communication and signal processing circuitry, modems, processor modules, embedded processors, and application-specific modules, including multilayer, multi-chip modules. Such signal synchronization apparatus can further be included as sub-components within a variety of electronic systems, such as televisions, cellular telephones, personal computers, radios, vehicles, and others. Further, the present invention can be implemented with and/or incorporated into any GPS device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, automotive equipment that incorporates GPS receivers, etc.

Figure 8:
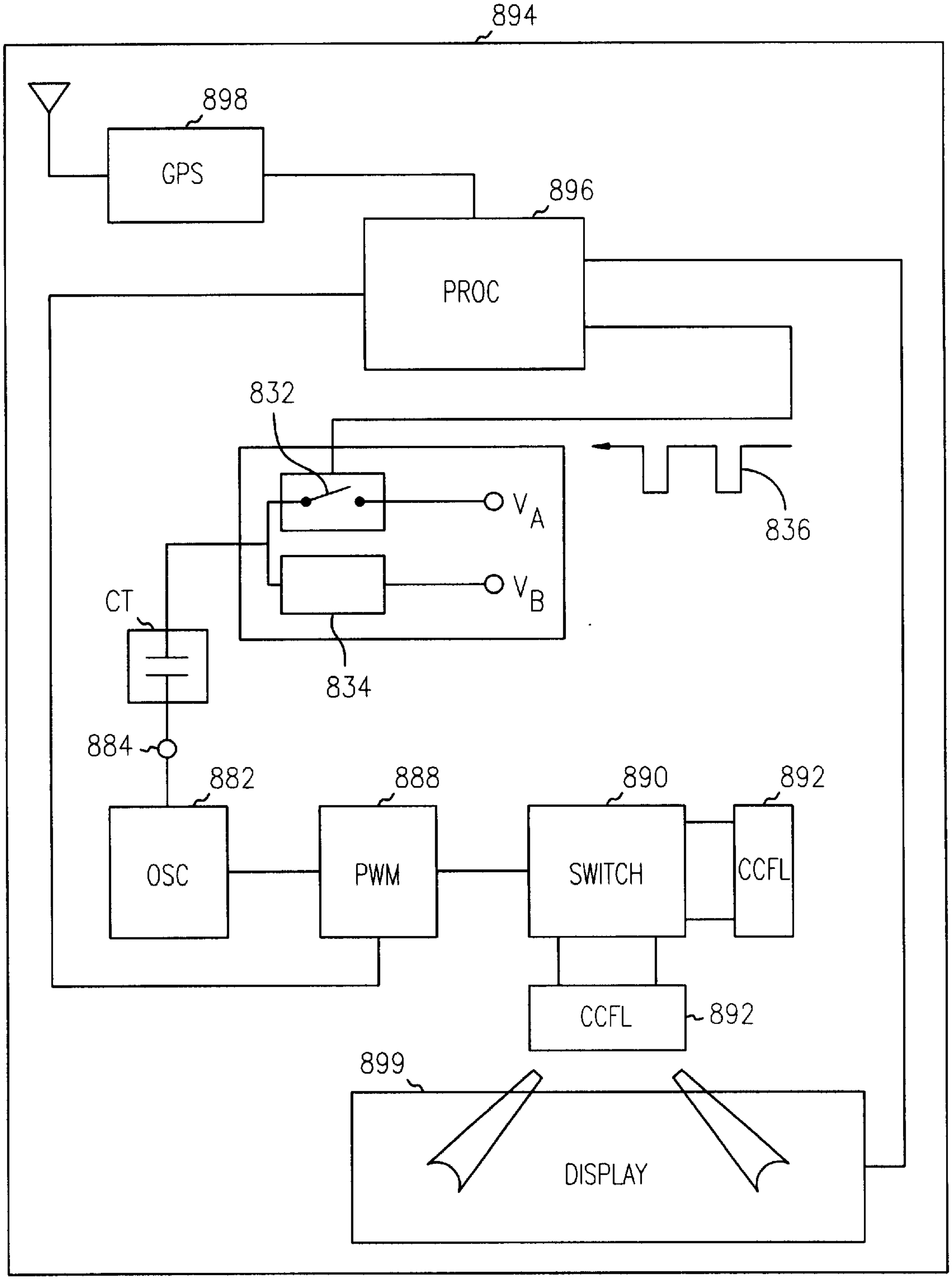
FIG. 8 is a block diagram of a computer according to an embodiment of the present invention.

For example, such an application can be seen in FIG. 8, which is a block diagram of a computer according to an embodiment of the present invention. As shown in FIG. 8, one embodiment of the computer 894 includes a processor 896 and at least one CCFL 892 capable of being communicatively coupled to the processor 896. The computer 894 also includes an oscillator 882 having a current source-sink connection. 884, a switch 832 coupled to the current source-sink connection 884 (typically using a capacitor $C_T$), a current path 834 coupled to the switch 832, and a self-oscillating, push-pull switching circuit 890 (e.g., a Royer-class converter) coupe d to the oscillator (in this case, using a pulse width modulator 888) and the CCFL 892. One side of the switch 832 can be connected to a reference $V_A$, such as ground, and one side of the current path 834 can be connected to a clamping voltage reference $V_B$, which is nearly equal to ground.

The switch 832 is configured to receive a synchronizing signal 836 having an active state and an inactive state, as described above, wherein the switch 832 has an ON state activated by the active state of the synchronizing signal 836, and deactivated by the inactive state of the synchronizing signal 836. The current path 834 is configured to pass a current when the ON state is deactivated, and the switch 832 is configured to pass the current when the ON state is activated. Those skilled in the art will realize that the synchronizing signal 836 can be provided by the processor 896, or any other appropriate signal source.

The computer 894 can include a GPS receiver 898 and a display 899, each capable of being communicatively coupled to the processor 896. Typically, the display 899 is backlighted by one or more CCFLs 892.

Figure 9:
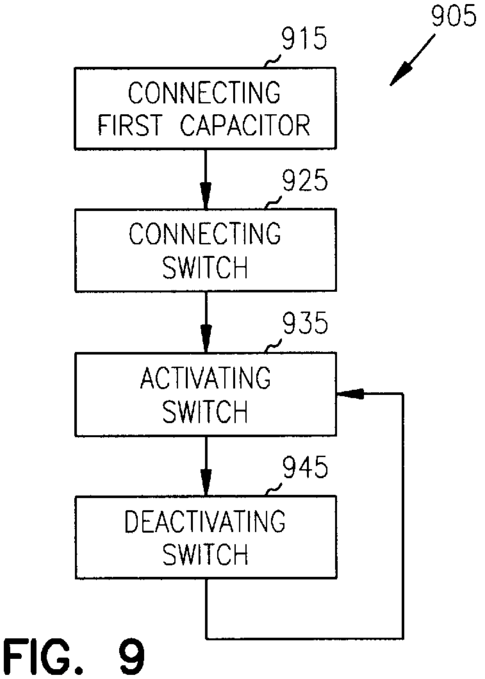
FIG. 9 is a flow diagram illustrating a method of adjusting the operation of an oscillator according to an embodiment of the present invention.

The invention also provides a method of adjusting the operation of an oscillator, as shown in the flow diagram of FIG. 9. The method 905 includes connecting a first capacitor (e.g., $C_T$) to an oscillator timing input at block 915, connecting a switch to the first capacitor at block 925, and activating the switch using a synchronizing signal in a first state (e.g. the active state) to pass a current from the timing input through the switch to charge the first capacitor at block 935. Typically, as noted above, the cycle time of the synchronizing signal is shorter than the cycle time of the oscillator natural (i.e., free-running) oscillation frequency. The method 905 also includes deactivating the switch using the synchronizing signal in a second state (e.g., the inactive state) to pass the current through a second capacitor (e.g., a capacitor substantially smaller in capacity than the first capacitor, such as a stray capacitance $C_S$) at block 945. The method 905 can terminate at this point, or continue with repeated execution of blocks 935 and 945, as the first capacitor is charged and discharged.

In any of the embodiments shown herein, the first and second capacitors can be physical capacitors. However, the second capacitor can also be a "stray" capacitor or capacitance, well known to those skilled in the art, associated with the switch. As noted in several previous examples, the switch can include a transistor, such that the synchronizing signal in the first state places the transistor in a saturated mode of operation (i.e., ON state, or substantially conducting), and such that the synchronizing signal in the second state places the transistor in the reverse-biased mode of operation (i.e., the OFF state, or substantially non-conducting).

Figure 1:
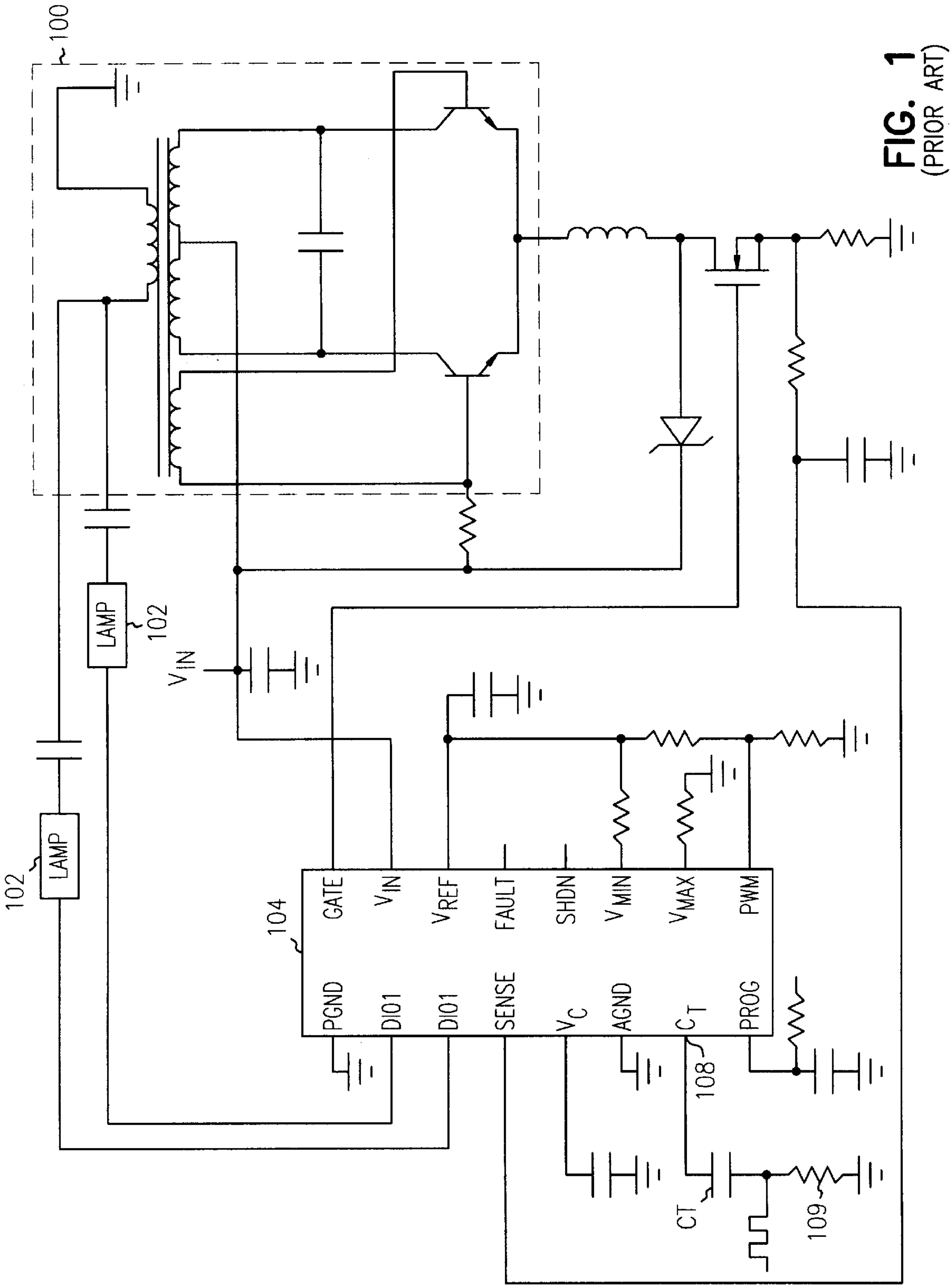
FIG. 1 (PRIOR ART)
FIG. 1, previously described, is a representative schematic diagram of a prior art power supply and synchronization circuit.
Figure 2:
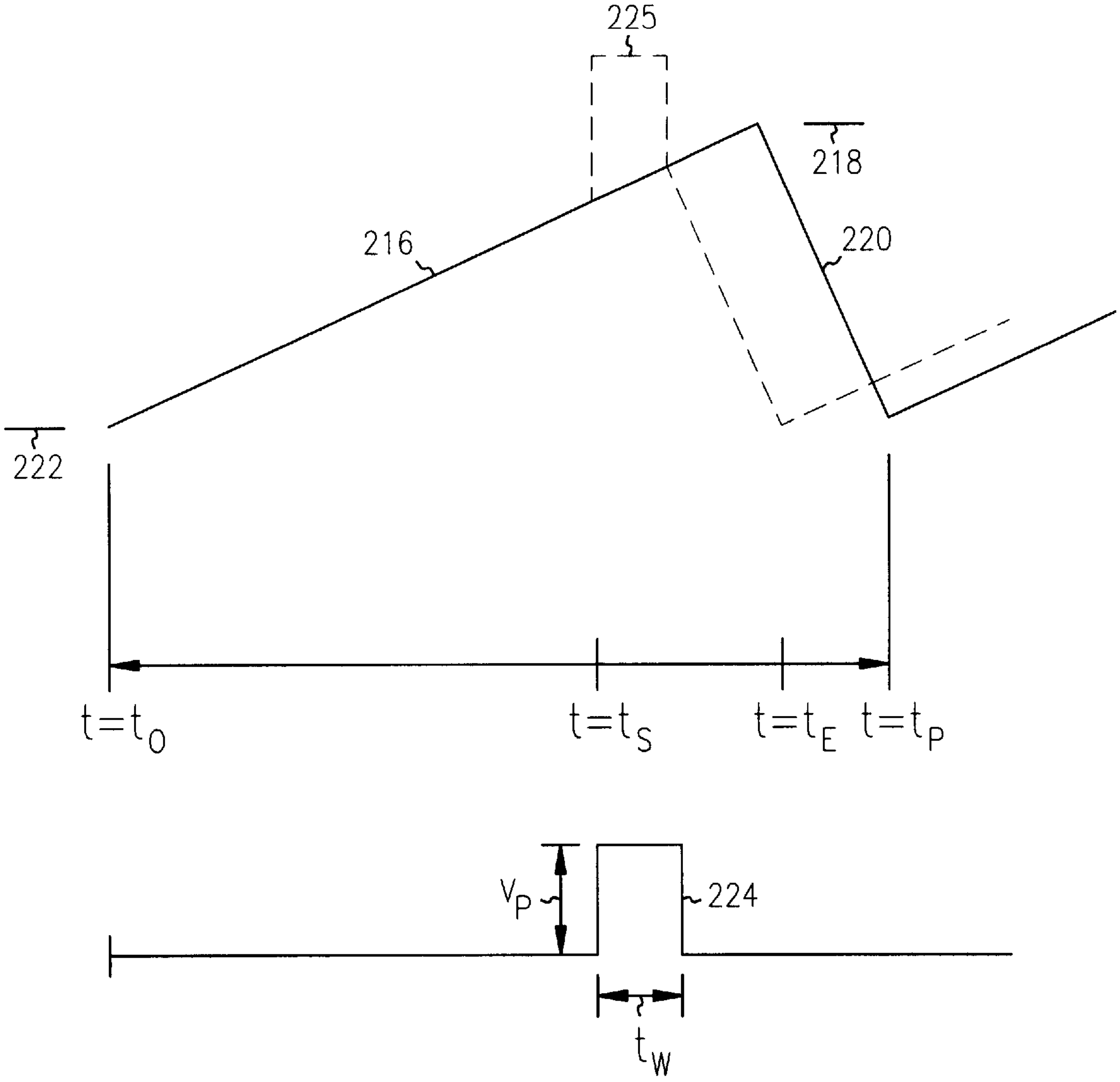
FIG. 2 (PRIOR ART)
FIG. 2, previously described, is a representation of the voltage present at the timing input pin of the prior art LT1768 PWM IC of FIG. 1.
Figure 3:
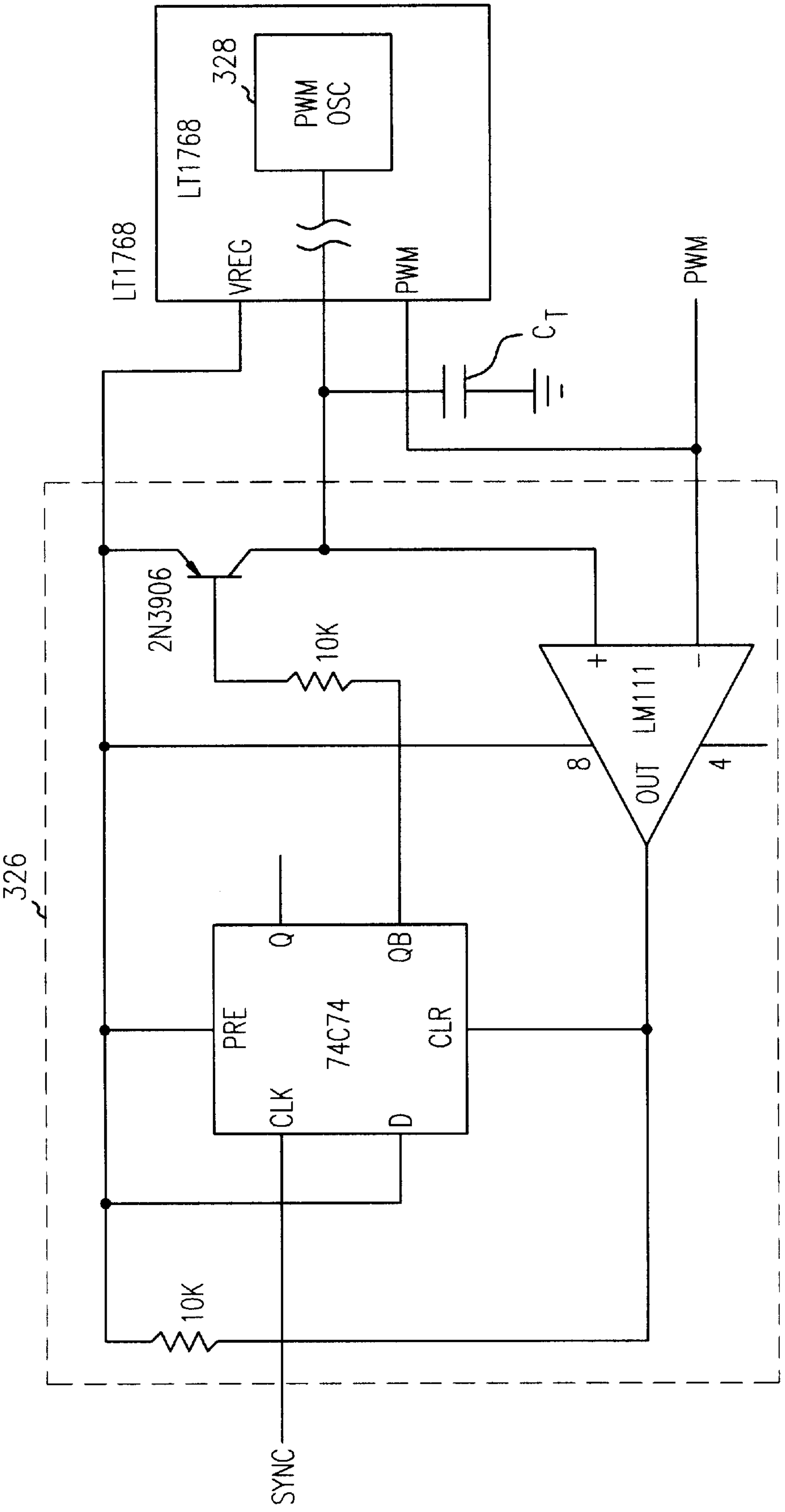
FIG. 3 (PRIOR ART)
FIG. 3, previously described, is a representative schematic diagram of a sophisticated prior art synchronization circuit which can be used with the prior art power supply of FIG. 1.
Figure 10:
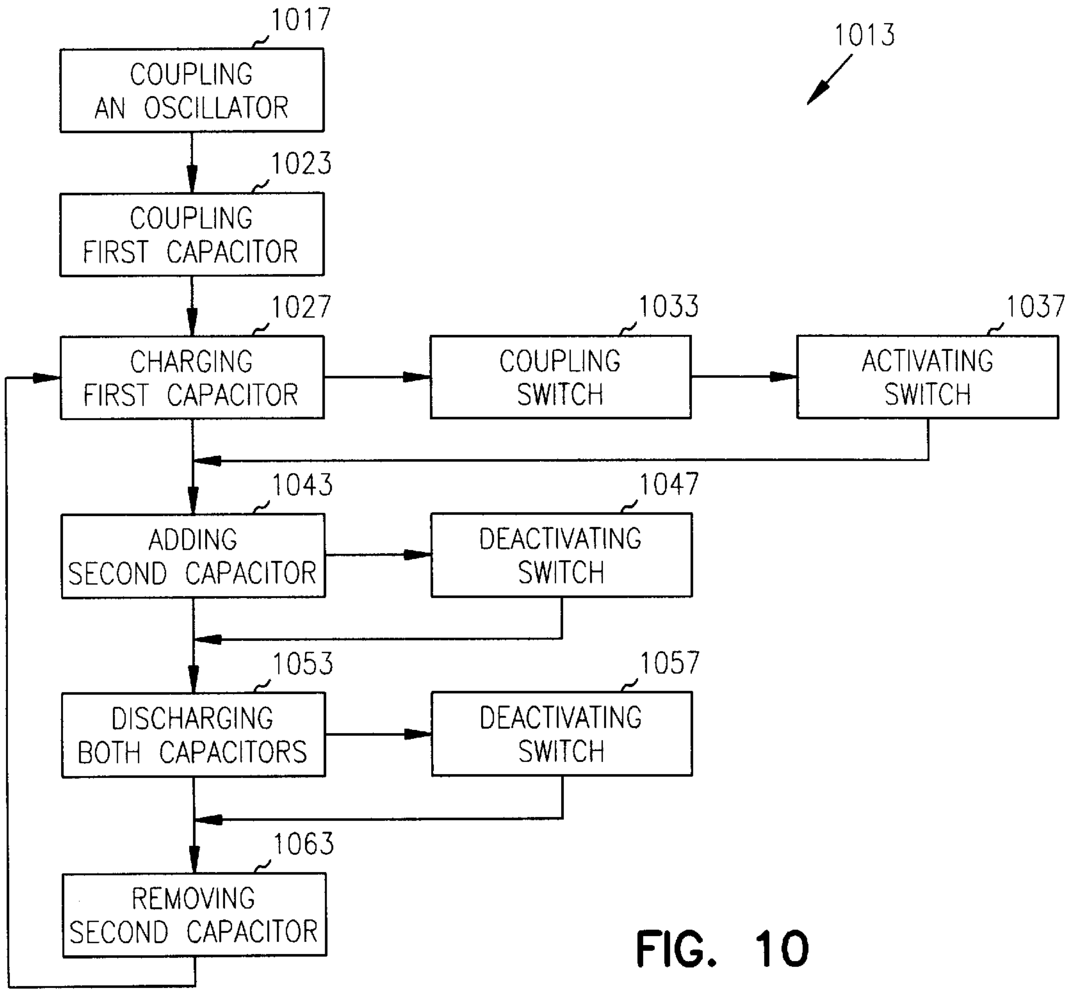
FIG. 10 is a flow diagram illustrating a method of operating a power converter according to an embodiment of the present invention.

Another embodiment of the invention is shown in FIG. 10, which is a flow diagram illustrating a method of operating a power converter. In this case, the method 1013 includes coupling an oscillator to a power converter drive circuit at block 1017 (e.g. coupling the oscillator to the gate of the FET controlling the Royer converter 100 in prior art FIG. 1, shown connected to the GATE output of the integrated circuit 104 in the prior art figure), coupling a first capacitor to a timing input of the oscillator at block 1023, and charging the first capacitor using a current which flows out of the timing input at block 1027.

The method 1013 can then continue with adding a second capacitor in series with the first capacitor to change the charging time of the series combination of the first and second capacitors, such that the resulting charging time for the series combination is shorter than the charging time of the first capacitor alone (at block 1043), and discharging both the first and second capacitors using a current which flows into the timing input at block 1053. The method can also include removing the second capacitor (i.e., decoupling the second capacitor from the first capacitor) at block 1063. At this point the method 1013 can terminate, or continue with repeated execution of blocks 1027, 1043, 1053, and 1063, as the first capacitor is charged and discharged in a cyclic fashion.

Charging the first capacitor at block 1027 can include coupling a switch to the junction of the first and second capacitors at block 1033, and activating the switch to charge the first capacitor using a synchronizing signal in a first state at block 1037. As noted previously, the cycle length or period of the synchronizing signal is typically shorter than the cycle length or period of the natural (i.e., free-running) period of the oscillation signal generated by the oscillator.

Adding a second capacitor in series with the first capacitor at block 1043 can include deactivating the switch to charge the series combination of the first capacitor and the second capacitor at block 1047. As noted previously, the second capacitor can be a stray capacitor or capacitance associated with the switch. Similarly, discharging both capacitors at block 1053 can include deactivating the switch using the synchronizing signal in a second (inactive) state at block 1057.

Those skilled in the art will realize that discharging the capacitors does not occur immediately upon opening or deactivating the switch. Rather, the capacitors discharge after the upper voltage threshold for the oscillator is reached, which occurs as a direct result of deactivating the switch. It is only when the upper threshold is reached that discharge occurs, due to sink current flowing into the timing input from the series combination of the first and second capacitors. It should also be noted that the time period during which the synchronizing signal is in the second state is typically substantially less than a time period during which the synchronizing signal is in the first state, and the sum of the time periods during which the synchronizing signal is in the first and second states will be less than the cycle time period of the natural frequency of oscillation for the oscillator.

CONCLUSION

The above circuits, computer, and methods have been described, by way of example and not by way of limitation, with respect to improving synchronization of various types of circuitry. Specifically, the present invention provides circuitry which uses a minimum number of parts to synchronize the operation of selected oscillation circuitry, in conjunction with internal current sources/sinks, so that the affect on the oscillation waveform, other than regulating its period, is minimal. The circuitry of the invention also operates to safely control the amplitude of the timing voltage waveform, such that maximum values are not exceeded, while not unduly restricting the length of the synchronizing pulse.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above apparatus, computer, and methods are used. The scope of the invention should be determined with reference to the appended claims, along with the full scope of equivalents to which such claims are entitled.

It should also be noted that, while various features of the invention have been grouped together in various single embodiments, this method of disclosure is not to be interpreted as reflecting an intention that the claimed invention requires more features than are expressly recited in each claim. Rather, as the following claims reflect, inventive aspects lie in less than all of features of a single, disclosed embodiment. Therefore, the following claims are hereby incorporated into the Description of the Preferred Embodiments, with each claim standing on its own as a separate preferred embodiment of the invention.

What is claimed is:

1. A circuit, comprising:

a switch configured to receive a synchronizing signal having an active state and an inactive state, wherein the switch has an on state activated by the active state and deactivated by the inactive state; and a current path coupled to the switch, wherein the current path is configured to pass a sink current when the on state is deactivated, and wherein the switch is configured to pass a source current in a direction opposite the sink current when the on state is activated.

2. The circuit of claim 1, wherein the switch includes a bipolar junction transistor and the current path includes a pair of diodes, and wherein a cathode of a selected one of the pair of diodes is coupled to the switch.

3. The circuit of claim 2, further comprising:

a resistor coupled between a voltage supply and an anode of each one of the pair of diodes, wherein the resistor has a value selected so that a magnitude of a current flowing from the voltage supply through the resistor is always greater than a magnitude of the sink current coupled to the switch.

4. The circuit of claim 1, wherein the switch and the current path are included in a single metal oxide semiconductor field effect transistor.

5. The circuit of claim 1, further comprising:

a capacitor coupled to the switch and the current path, wherein the capacitor is coupled to an integrated circuit pin configured to source and sink the current.

6. The circuit of claim 1, wherein the current path includes a voltage clamping circuit.

* * * * *